(12) United States Patent
Agarwal

(10) Patent No.: US 10,325,262 B2
(45) Date of Patent: Jun. 18, 2019

(54) CONTROLLING MOBILE PAYMENT TRANSACTIONS BASED ON RISK SCORES FOR POINT-OF-SALE TERMINALS DETERMINED FROM LOCATIONS REPORTED BY MOBILE TERMINALS

(71) Applicant: CA, INC., New York, NY (US)

(72) Inventor: Gaurav Agarwal, Kodihalli (IN)

(73) Assignee: CA, INC., New York, NY (US)

( * ) Notice: Subject to any disclaimer, the term of this patent is extended or adjusted under 35 U.S.C. 154(b) by 664 days.

(21) Appl. No.: 14/822,134

(22) Filed: Aug. 10, 2015

(65) Prior Publication Data

US 2017/0046706 A1 Feb. 16, 2017

(51) Int. Cl.
*G06Q 20/40* (2012.01)
*G06Q 20/20* (2012.01)
*G06Q 20/32* (2012.01)

(52) U.S. Cl.
CPC ......... *G06Q 20/4016* (2013.01); *G06Q 20/20* (2013.01); *G06Q 20/327* (2013.01)

(58) Field of Classification Search
None
See application file for complete search history.

(56) References Cited

U.S. PATENT DOCUMENTS

| | | | | |
|---|---|---|---|---|
| 7,089,208 B1 * | 8/2006 | Levchin | ................. | G06Q 20/02 705/39 |
| 8,020,763 B1 * | 9/2011 | Kowalchyk | .......... | G06Q 20/102 235/380 |
| 8,214,196 B2 * | 7/2012 | Yamada | .............. | G06F 17/2818 704/2 |
| 8,504,423 B2 * | 8/2013 | Rotbard | ................. | G06Q 20/20 705/14.49 |
| 8,762,272 B1 * | 6/2014 | Cozens | .................. | G06Q 20/10 705/40 |
| 9,626,679 B2 * | 4/2017 | Bhorania | ........... | G06Q 20/4016 |
| 9,659,304 B1 * | 5/2017 | Toewe | ............... | G06Q 30/0226 |
| 9,704,152 B1 * | 7/2017 | Rolf | ........................ | G06Q 20/02 |
| 9,727,859 B1 * | 8/2017 | Toewe | ............... | G06Q 20/3674 |
| 10,049,349 B1 * | 8/2018 | Grassadonia | .......... | G06Q 20/10 |

(Continued)

*Primary Examiner* — Fateh M Obaid
(74) *Attorney, Agent, or Firm* — Sage Patent Group

(57) ABSTRACT

A method of performing operations on a processor of a mobile payment transaction processing system, includes receiving mobile payment messages from a point-of-sale (POS) terminal operated by a merchant performing mobile payment transactions with mobile terminals. Each of the mobile payment messages contains transaction information, a network address for the POS terminal, and a geographic location provided by the mobile terminal. A POS terminal risk score is generated based on similarity between the geographic locations provided by the mobile terminals contained in the mobile payment messages which also contain the network address for the POS terminal. Processing of another mobile payment message, which is received from the POS terminal performing another mobile payment transaction with another mobile terminal subsequent to the generating of the POS terminal risk score, is controlled based on the POS terminal risk score and transaction information contained in the another mobile payment message. Related computer nodes of mobile payment transaction processing systems are disclosed.

17 Claims, 4 Drawing Sheets

(56) References Cited

U.S. PATENT DOCUMENTS

| | | | |
|---|---|---|---|
| 2012/0158589 A1* | 6/2012 | Katzin | G06Q 20/12 705/44 |
| 2013/0262316 A1* | 10/2013 | Hruska | G06Q 20/227 705/67 |
| 2013/0268378 A1* | 10/2013 | Yovin | G06Q 20/204 705/18 |
| 2014/0046786 A1* | 2/2014 | Mazaheri | G07G 1/0081 705/18 |
| 2014/0207679 A1* | 7/2014 | Cho | G06Q 20/108 705/44 |
| 2015/0348040 A1* | 12/2015 | Bhorania | G06Q 20/4016 705/16 |
| 2016/0086261 A1* | 3/2016 | Shah | G06Q 40/025 705/38 |
| 2017/0011383 A1* | 1/2017 | Melzer | G06Q 10/10 |

* cited by examiner

CONTROLLING MOBILE PAYMENT TRANSACTIONS BASED ON RISK SCORES FOR POINT-OF-SALE TERMINALS DETERMINED FROM LOCATIONS REPORTED BY MOBILE TERMINALS

BACKGROUND

The present disclosure relates to mobile payment transaction processing systems.

Financial transactions relating to purchasing goods and services are predominately paid for using credit accounts and debit accounts that an account owner accesses through associated credit cards and debit cards. Financial transaction processing systems provide verification processes that allow merchants to verify that account information is valid and the account owner has sufficient credit or debit funds to cover the purchase.

When a purchaser having a physical credit card is located at the merchant's facility, the merchant has been responsible for authenticating that the purchaser is the credit card owner by, for example, comparing the purchaser's signature to an existing signature on the credit card and/or examining a picture ID of the purchaser. In contrast, mobile payment systems have emerged that eliminate the use of physical credit cards by allowing purchasers to wirelessly communicate information from their mobile terminals through short-range communication interfaces to merchants' point-of-sale (POS) terminals. The POS terminals are typically mounted to check-out counters or are transportable to purchasers. An application on the mobile terminal queries a user to enter a correct personal identification number (PIN) or password in order to trigger the mobile terminal to communicate mobile payment information through a Near Field Communication (NFC) link or another radio frequency, magnetic, or other communication link to the POS terminal for authorization and further processing by a financial transaction processing system.

Although the security of mobile payment systems is an improvement over use of physical credit cards, security weakness still exist due to, for example, the ability for sophisticated fraudsters to operate POS terminals in a way that fraudulent emulates presence of a mobile terminal operated by an account owner.

SUMMARY

A method of performing operations on a processor of a mobile payment transaction processing system, includes receiving mobile payment messages from a point-of-sale (POS) terminal operated by a merchant performing mobile payment transactions with mobile terminals. Each of the mobile payment messages contains transaction information, a network address for the POS terminal, and a geographic location provided by the mobile terminal. A POS terminal risk score is generated based on similarity between the geographic locations provided by the mobile terminals contained in the mobile payment messages which also contain the network address for the POS terminal. Processing of another mobile payment message, which is received from the POS terminal performing another mobile payment transaction with another mobile terminal subsequent to the generating of the POS terminal risk score, is controlled based on the POS terminal risk score and transaction information contained in the another mobile payment message.

Some other embodiments disclosed herein are directed to a computer node of a mobile payment transaction processing system that includes a processor and a memory. The memory is coupled to the processor and includes computer readable program code that when executed by the processor causes the processor to perform operations. The operations include receiving mobile payment messages from a POS terminal operated by a merchant performing mobile payment transactions with mobile terminals. Each of the mobile payment messages contains transaction information, a network address for the PUS terminal, and a geographic location provided by the mobile terminal. The operations further include generating a POS terminal risk score based on similarity between the geographic locations provided by the mobile terminals contained in the mobile payment messages which also contain the network address for the POS terminal. The operations further include controlling processing of another mobile payment message, which is received from the POS terminal performing another mobile payment transaction with another mobile terminal subsequent to the generating of the POS terminal risk score, based on the POS terminal risk score and transaction information contained in the another mobile payment message.

Other methods, computer nodes of mobile payment transaction processing systems, and computer program products according to embodiments will be or become apparent to one with skill in the art upon review of the following drawings and detailed description. It is intended that all such additional methods, computer nodes of mobile payment transaction processing systems, and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

The rate of fraud occurring with mobile payment transaction is expected to continue to increase with the sophistication of fraudsters and security weaknesses introduced by the increasing number of various types of mobile terminals that are used to conduct mobile payment transaction. As used herein, mobile terminals can include, but are not limited to smart phones, tablet computers, laptop computers, etc. Reliance on a mobile terminal identifier and/or a PIN or a password associated with an eCommerce transaction may not be sufficient to prevent fraud in view of the ability of sophisticated fraudsters to operate POS terminals in a way that fraudulent emulates presence of a mobile terminal operated by an account owner. Various embodiments of the present disclosure provide an extra level of security to identify such fraudulent mobile payment transactions.

Figure 1:
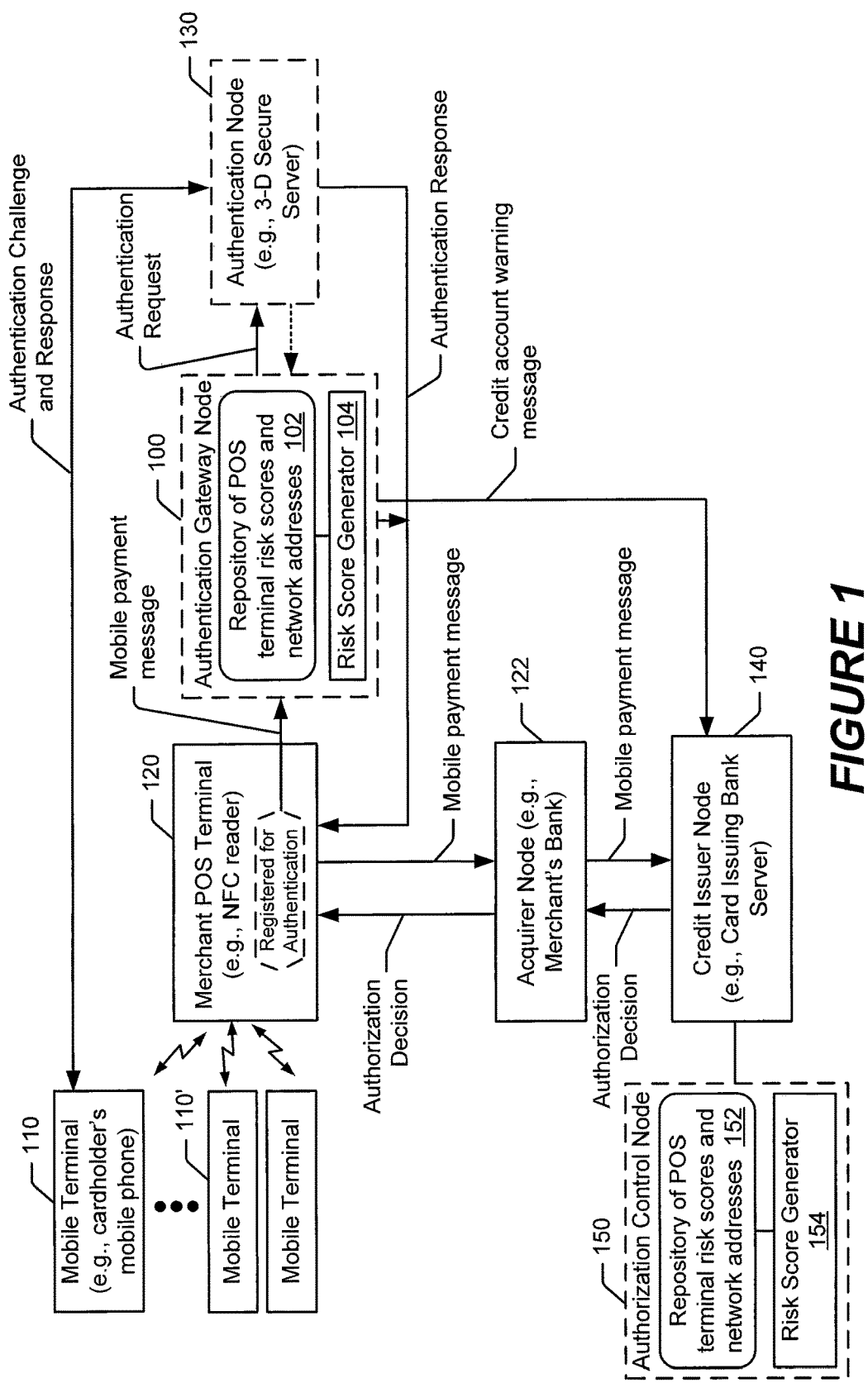
FIG. 1 is a block diagram of a mobile payment transaction processing system that can include an authorization control node that controls which mobile payment transactions from point-of-sale (POS) terminals are authorized and/or can include an authentication gateway node that controls which mobile payment transactions from the POS terminals are selected for authentication by an authentication node, in accordance with some embodiments.

FIG. 1 is a block diagram of a mobile payment transaction processing system that can include an authorization control node 150 that controls which mobile payment transactions from merchant POS terminals 120 are authorized and/or can include an authentication gateway node 100 that controls which mobile payment transactions from the POS terminals 120 are selected for authentication by an authentication node 130, in accordance with some embodiments. FIGS. 2-6 are flowcharts that illustrate operations that may be performed by the authorization control node 150 and/or by the authentication gateway node 100 in accordance with some embodiments.

Referring to FIG. 1, a POS terminal 120 can be expected to have a same location or substantially the same location over a defined time duration, such as when the POS terminal 120 is mounted to a merchant's check-out counter or is transported to purchasers located within the merchant's facility. Some embodiments of the present system are directed to determining a risk score for the POS terminal 120 based on its geographic location. These embodiments learn over time the geographic location of the POS terminal 120 based on geographic locations that are reported by mobile terminals that are performing mobile payment transactions with the POS terminal 120. Because mobile payment transactions involve communications over very short ranges, the reported locations of the mobile terminals correspond to that of the POS terminal 120.

In some further embodiments, the risk score for the POS terminal 120 is generated based on similarity between the geographic locations reported by the mobile terminals, consistency of the geographic locations over a defined threshold time, and/or presence of the geographic locations being within a geo-fence region in which the merchant is expected to operate. The risk score may be generated based on whether the geographic locations reported by the mobile terminals are within a region defined by a business address, zip code, telephone area code, and/or other information defining a location of the merchant which has been registered with or is obtainable by the system.

The system stores the risk score for the POS terminal 120 logically associated with a network address of the POS terminal 120, so that the risk score can be retrieved in the future when a mobile payment message is received it does not contain a geographic location reported by the mobile terminal. The network address of the POS terminal 120 may be any identifier which the system can use to communicate with the POS terminal 120. In this manner, a geographic location-based risk score for a POS terminal 120 can be determined for use in controlling processing of a mobile payment message, even when the mobile terminal involved in not configured to determine and/or report its present geographic location as part of a mobile payment transaction and/or is not capable of determining its geographic location because of absence or insufficiency of necessary positioning signaling.

During a mobile payment transaction between a mobile terminal 110 and the POS terminal 120 operated by the merchant, the mobile terminal 110 reports its geographic location to the POS terminal 120. The POS terminal 120 generates a mobile payment message which contains transaction information, a network address for the POS terminal 120, and the geographic location provided by the mobile terminal 110.

The mobile payment transaction may be based on Google Wallet, Apple Pay, and/or another mobile payment transaction protocol. In accordance with the Apple Pay protocol, the user terminal 110 may communicate to the POS terminal 120 a transaction token that is a proxy for the credit card number and is generated to be unique to the particular POS terminal 120. The transaction token may include a Device Account Number (DAN) which identifies the mobile terminal 110 and a device specific dynamic security code which is generated by an application executed by the mobile terminal 110 which communicates through a NFC link or another radio frequency, magnetic, or other communication link with another application executed by the POS terminal 120. The device specific dynamic security code may be a crytogram.

In accordance with various present embodiments, the user terminal 110 also communicates information identifying its present geographic location. The user terminal 110 may determine its location based on a global position system (GPS) signals received by a GPS receiver circuit, by triangulation of cellular signals received from cellular radio transceiver base stations having known geographic locations, by use of a geographic location of the mobile terminal 110 received from a cellular radio transceiver base station; and/or by use of a known geographic location of a stationary wireless access point (e.g., WIFI access point, Bluetooth device, etc.) that is identified as being within communication range of a wireless transceiver within the mobile terminal 110.

The mobile payment message is communicated to a computer node of the mobile payment transaction processing system. As will be explained in further detail below, the computer node may be the authorization control node 150, the authentication gateway node 100, and/or another node networked to the POS terminal 120. Although the system of FIG. 1 illustrates a single POS terminal 120 for simplicity of illustration, it is to be understood that the mobile payment transaction processing system may communicate within any number of POS terminals operated by any number of merchants.

Figure 2:
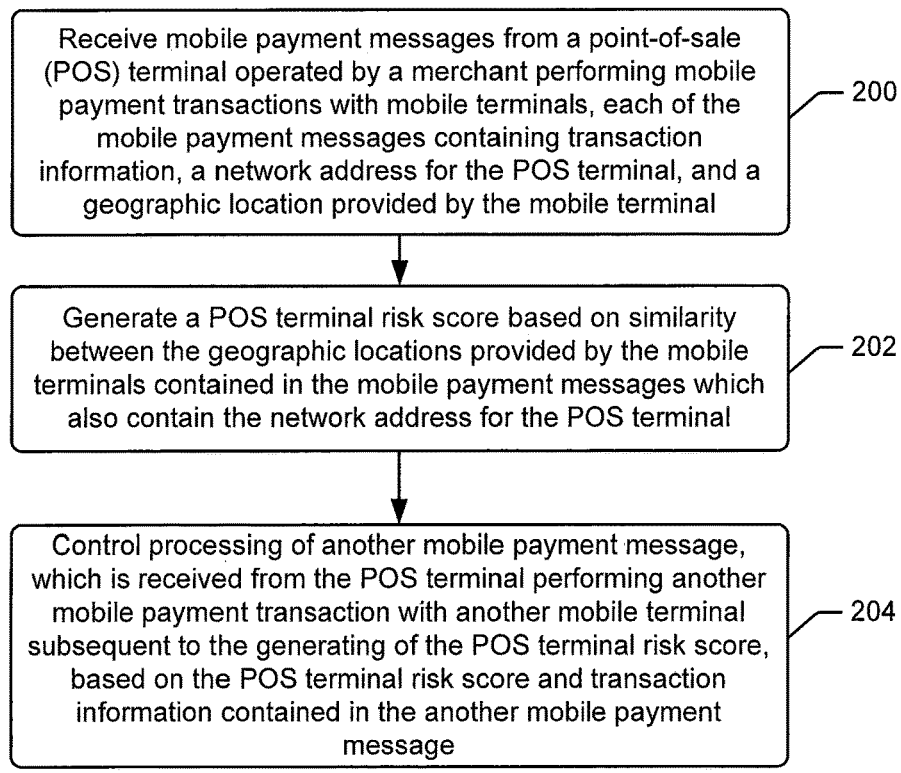
FIGS. 2-6 are flowcharts that illustrate operations that may be performed by an authorization control node and/or by an authentication gateway node in accordance with some embodiments.

Referring to FIGS. 1 and 2, over time the computer node receives (block 200) mobile payment messages from the POS terminal 120 arising from a series of mobile payment transactions with mobile terminals 110 operated by purchasers (e.g., a line of purchasers sequentially processed at a check-out counter). Each of the mobile payment messages contains transaction information, a network address for the POS terminal 120, and a geographic location provided by the mobile terminal. The computer node generates (block 202) a risk score of the POS terminal 120, referred to as a POS terminal risk shore, based on similarity between the geographic locations provided by mobile terminals contained in the mobile payment messages which also contain the network address for the POS terminal. The computer node controls (block 204) processing of another mobile payment message, which is received from the POS terminal 120 performing another mobile payment transaction with another mobile terminal 110' subsequent to the generating of the POS terminal risk score, based on the POS terminal risk score and transaction information contained in the another mobile payment message.

In one embodiment of FIG. 1, the computer node is the authorization control node 150. The mobile payment messages are communicated through an acquirer node 122, which may correspond to the merchant's bank server. The acquirer node 122 routes the mobile payment messages to a credit issuer node 140, which may correspond to the card issuing bank server such as a Visa or other card server via VisaNet, BankNet, etc. The credit issuer node 140 provides the mobile payment messages to the authorization control node 150 which generates the POS terminal risk score. Generation of an authorization decision for the mobile payment transaction can be controlled based on the POS terminal risk score and based on whether an account identified based on the transaction information has a sufficient credit limit and/or existing funds to cover the amount of the mobile payment transaction.

Figure 3:
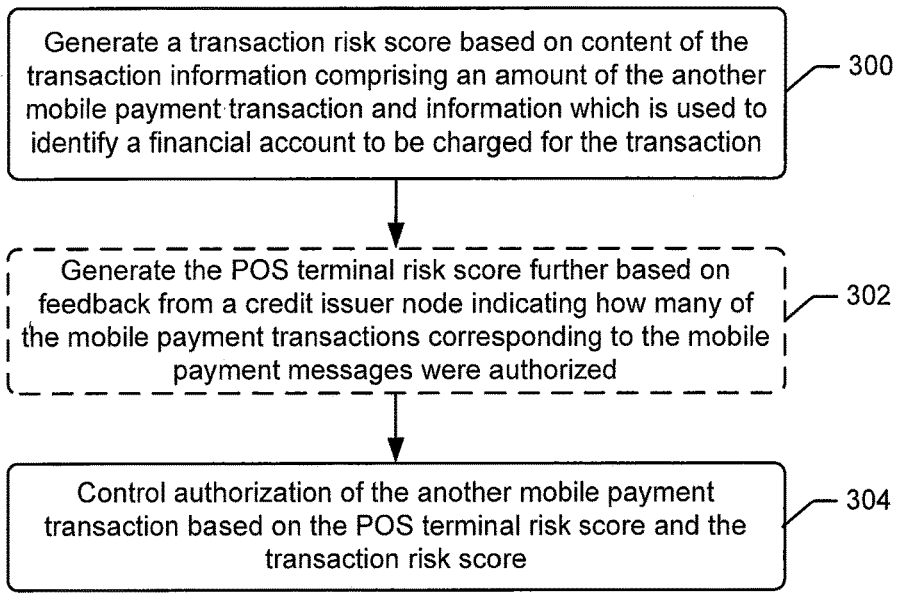

In the embodiment of FIG. 3, the authorization control node 150 and/or the credit issuer node 140 generates (block 300) a transaction risk score based on content of the transaction information comprising an amount of a mobile payment transaction and information which is used to identify a financial account to be charged for the transaction. The authorization control node 150 may further generate (block 302) the POS terminal risk score based on feedback from the credit issuer node 140 indicating how many of the mobile payment transactions corresponding to the mobile payment messages were authorized. For example, the POS terminal risk score may be generated to indicate a higher risk when a corresponding greater number of transactions arising from the POS terminal 120 are not authorized. In contrast, the POS terminal risk score may be generated to indicate a lower risk when a corresponding lower number of transactions arising from the POS terminal 120 are authorized. The authorization control node 150 in conjunction with the credit issuer node 140 can then control (block 304) authorization of the mobile payment transaction based on the POS terminal risk score and the transaction risk score.

The credit issuer node 140 communicates its authorization decision to the acquirer node 122, which communicates an authorization decision to the POS terminal 120 that controls the POS terminal 120 to selectively allow or deny completion of the mobile payment transaction with the purchaser.

The authentication gateway node 100 can include a risk score generator 154 that generates the POS terminal risk scores in accordance with one or more embodiments herein, and a repository 152 in memory that stores the POS terminal risk scores with a logical association with (e.g., mapped to) the network addresses for a plurality of different POS terminals. As mobile payment messages are received over time from a plurality of different POS terminals 120, the risk score generator 154 can generate new risk scores for POS terminals which don't yet have a risk score in the repository 150, and can retrieve and/or update risk scores for other POS terminals that have risk scores in the repository 150. For example, responsive to receiving (block 200) the mobile payment messages, the risk score generator 154 can store in the repository 152 the generated (block 202) POS terminal risk score logically associated with the network address for the POS terminal 120.

In one embodiment, network address for the POS terminal 120 may be a cellular radio transceiver base station identifier for a base station which is presently providing cellular communication services for the POS terminal 120. In another embodiment, the network address includes at least a portion of a network routing path of a mobile payment message for communication from the POS terminal 120 to a system node. The network address may correspond to a source address of the mobile payment message from the POS terminal 120.

The stored POS terminal risk scores can then be used to determine the risk associated with a network address of a POS terminal contained in a mobile payment message without requiring that the mobile payment message also contain a geographic location provided by the mobile terminal. Indeed, not all mobile terminals may be configured to determine their present geographic location, may not be presently capable of determining its geographic location because, for example, necessary positioning signaling (e.g., GPS signals) are presently unavailable, and/or may not be configured to communicate its geographic location to the POS terminal 120 as part of a mobile payment transaction.

Responsive to subsequently receiving another mobile payment message from the POS terminal 120, the risk score generator 154 retrieves the POS terminal risk score of the POS terminal 120 from the repository 152 based on the network address for the POS terminal 120 contained in the another mobile payment message, and communicates with the credit issuer node 140 to control (block 204) its selective authorization of the another mobile payment message based on the POS terminal risk score retrieved from the repository 152. Thus, the another mobile payment message does not need to contain a geographic location provided by the another mobile terminal, because the risk score generator 154 retrieves the risk score from the repository 154 using the network address of the POS terminal 120 contained in the another mobile payment message. Authentication and/or other processing of the another mobile payment message can therefore be controlled based on the POS terminal risk score retrieved from the repository 152 and the transaction information contained in the another mobile payment message.

Although the authorization control node 150 is shown as being separate from the credit issuer node 140 and the acquirer node 122, in some embodiments the authorization control node 150 is incorporated into the credit issuer node 140 and/or the acquirer node 122 so that at least some of the operations disclosed herein as being performed by the authorization control node 150 are performed within the credit issuer node 140 and/or the acquirer node 122.

Figure 5:
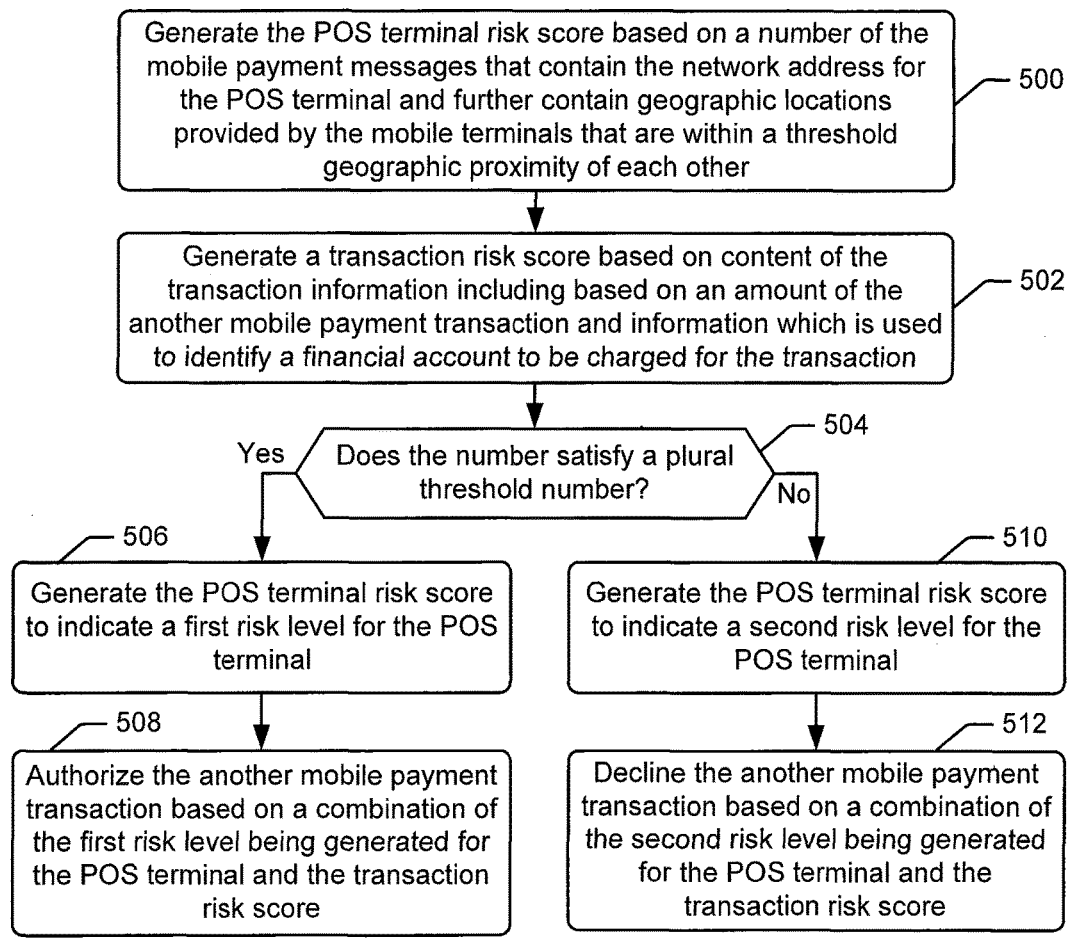

Further operations that may be performed by the authorization control node 150 in conjunction with the credit issuer node 140 are illustrated in the flowchart of FIG. 5. The risk score for the POS terminal 120 can be generated based on similarity between the geographic locations reported by the mobile terminals, based on consistency of the geographic locations over a defined threshold time, and/or based on presence of the geographic locations being within a geo-fence region in which the merchant is expected to operate.

Referring to FIG. 5, the authorization control node 150 can generate (block 500) the POS terminal risk score based on a number of the mobile payment messages that contain the network address for the POS terminal and further contain geographic locations provided by the mobile terminals 110 that are within a threshold geographic proximity of each other. The authorization control node 150 and/or the credit issuer node 140 can generate (block 502) the transaction risk score based on content of the transaction information, including based on an amount of the mobile payment transaction and information which is used to identify a financial account be charged for the transaction.

The node 150/140 determines (block 504) whether the number of the mobile payment messages that contain the network address for the POS terminal and further contain geographic locations provided by the mobile terminals 110 that are within a threshold geographic proximity of each other, exceeds a plural threshold number. If it exceeds, the POS terminal risk score is generated (block 506) to indicate a first risk level for the POS terminal 110, and the node 150/140 authorizes (block 508) the mobile payment transaction based on a combination of the first risk level been generated for the POS terminal 110 and the transaction risk score. In sharp contrast, if the number does not exceed the threshold number, the POS terminal risk score is generated (block 510) to indicate a second risk level, which corresponds to a higher risk of fraud, for the POS terminal 110, and the node 150/140 declines (block 512) the mobile payment transaction based on a combination of the second POS terminal risk score being generated for the POS terminal 110 and the transaction risk score.

Consequently, given the same transaction risk score, the mobile payment transaction is either authorized or denied depending upon whether the number of the mobile payment messages that contain the network address for the POS terminal and further contain geographic locations provided by the mobile terminals 110 that are within a threshold geographic proximity of each other, exceeds a plural threshold number.

The POS terminal risk score may be generated based on how many different mobile terminals have reported locations during mobile payment transactions through the PUS terminal 120. The POS terminal 120 may be determined to have a lower risk score when it has been used with more than a threshold number of different mobile terminals, which can indicate a lower likelihood of fraudulent use. In one embodiment, each of the mobile payment messages further contains a mobile terminal identifier. The POS terminal risk score is generated based on a number of the mobile payment messages that contain the network address for the POS terminal 120 and further contain geographic locations provided by the mobile terminals that are within a threshold geographic proximity of each other. The POS terminal risk score is further generated based on how many of the number of the mobile payment messages contain mobile terminal identifiers that are different from each other.

In a further embodiment, the POS terminal risk score is generated to indicate a lower level of risk for the POS terminal 120 based determining that the number of the mobile payment messages containing mobile terminal identifiers that are different from each other exceeds a defined threshold number. In contrast, the POS terminal risk score is generated to indicate a higher level of risk for the POS terminal 120 based determining that the number of the mobile payment messages containing mobile terminal identifiers that are different from each other does not exceed the defined threshold number.

Because of the prevalence of fraud occurring in eCommerce and other card-not-present financial transactions, where merchants do not typically authenticate purchasers using picture IDs, electronic authentication processes have been introduced to authenticate purchasers. Electronic authentication processes can be performed by an authentication node 130 to attempt to confirm that the purchaser is an account owner or is otherwise authorized by the account owner. Some other embodiments of the present disclosure are directed to the computer node which generates the POS terminal risk score being within the authentication gateway node 100. The authentication gateway node 100 uses the POS terminal risk score to control whether authentication is performed on a purchaser who is operating the mobile terminal 110.

If the POS terminal 120 is registered for use of electronic authentication processes, the POS terminal 120 generates a mobile payment message containing transaction information, a network address for the POS terminal 120, and a geographic location provided by the mobile terminal. The transaction information can include the information described above and/or one may include any one or more of a mobile terminal identifier for the mobile terminal 110, an account number (e.g., credit/debit card number), expiration date for the card, Verification value (e.g., CVV), cardholder's name, the cardholder's home address, geographic location of the mobile terminal, identifier for the merchant node 120, time of transaction, and date of transaction. The mobile terminal identifier for the mobile terminal 110 uniquely identifies the mobile terminal, such as by a telephone number of the mobile terminal, a International Mobile Subscriber Identity of the mobile terminal, and/or an identifier assigned to the mobile terminal 110 by an application executed by the mobile terminal 110 or stored on the mobile terminal 110 during account setup/maintenance with the issuer node 140 and/or the merchant node 120. The mobile terminal identifier may be communicated from the mobile terminal 110 to the POS terminal 120 or may determined by the POS terminal 120 or another system component and included in the mobile payment message.

The POS terminal 120 communicates the mobile payment message toward the authentication node 130 for authentication processing to authenticate the purchaser. The POS terminal 120 may communicate the mobile payment message using a software plug-in provided by a provider of the authentication node 130. Authentication of the purchaser can include determining whether the purchaser possesses secret information that should only be known to the account owner or another person who has been authorized by the account owner to make purchases using the account.

An authentication gateway node 100 is disclosed herein that uses the POS terminal risk score to control which mobile payment messages from the POS terminal 120 cause authentication of purchasers. The authentication gateway node 100 may also generate based on the POS terminal risk score a credit account warning message which notifies the credit issuer node 140 that an account owner should be contacted and/or that privileges with an account should be halted/frozen or otherwise modified.

The authentication gateway node 100 may intercept or otherwise receive the mobile payment message from the POS terminal 120 and determine whether authentication will be performed by the authentication node 130. The authentication gateway node 100 may, for example, selectively either route the mobile payment message to the authentication node 130 for authentication or respond to the POS terminal 120 without authentication by the authentication node 130 (e.g., some mobile payment messages bypass the authentication node 130). Alternatively, the authentication gateway node 100 may mark the mobile payment messages to indicate whether they are to be authenticated by the authentication node 130 (e.g., all mobile payment messages flow through the authentication node 130 but only some cause authentication). These and other operations by the authentication gateway node 100 are described in further detail below.

Pursuant to one type of authentication process, the authentication node 130 communicates an authentication challenge message to the mobile terminal 110 and/or to the POS terminal 120 which requires the purchaser to enter a security code to complete the purchase. The entered security code is returned to the authentication node 130 in a response message. The security code may be a password, personal identification number (PIN), electronic security token, or other secret information known to the account owner.

The authentication node 130 can compare the security code to an expected code, and apply one or more rules which may be defined by the card issuing bank (referred to more generally as the credit/debit finance issuer node 140 below) to generate an authentication response (e.g., authentication response code) that indicates an outcome of the authentication process.

One type of authentication process is known as a 3-D Secure protocol that can be performed by the authentication node 130 operating as a 3-D Secure authentication server. The 3-D Secure protocol was developed by financial card associations, including Visa and MasterCard, and has become an industry standard. The protocol uses XML messages sent over secure socket layer (SSL) connections between the mobile terminal 110 or the POS terminal 120 and the authentication node 130, which an also be referred to as an access control server (ACS). The authentication challenge can be presented through the mobile terminal 110 to the purchaser within the same web browser window as an in-line session (referred to as an inframe authentication session) or can be presented in a separate window (e.g., pop-up window).

An advantage to merchants of using purchaser authentication is a reduction in "unauthorized transaction" chargebacks. A disadvantage to merchants is that they pay a software setup fee, monthly fee, and per-authentication fee for use of the 3-D Secure access control server provided by the authentication node 130. Moreover, 3-D Secure operation can be complicated and create transaction failures.

For these and other reasons, some embodiments disclosed herein are directed to the authentication gateway node 100 containing a risk score generator 104 and a repository 102 of POS terminal risk scores and network addresses. The generator 104 may operate as described herein for the generator 154. Similarly, the repository 102 may operate as described above for the repository 152. The authentication gateway node 100 generates a POS terminal risk score based on similarity between the geographic locations provided by the mobile terminals contained in the mobile payment messages which also contain the network address for the POS terminal 120, and may further generate the POS terminal risk score based on one or more of the other embodiments described herein. The authentication gateway node 100 controls which mobile payment messages trigger authentication based on the POS terminal risk scores.

The authentication gateway node 100 can be configured to operate on mobile payment messages in-flight before being delivered to the authentication node 130, and control, based on the risk scores, which of the mobile payment messages are processed by the authentication node 130 for authentication of purchasers and generation of authentication responses based on the outcomes of the authentication.

In one embodiment, only mobile payment messages having POS terminal risk scores that satisfy a defined rule are provided to the authentication node 130 for authentication processing and generation of the authentication responses based on the authentication processing, while other mobile payment messages (having POS terminal risk scores that do not satisfy the defined rule) bypass authentication processing by the authentication node 130. When bypassing authentication processing by the authentication node 130, the authentication gateway node 100 may generate an authentication response based on the POS terminal risk score (e.g., generate an authentication response indicating that the purchaser was properly authenticated) and communicate the authentication response to the POS terminal 120 as if it had originated from the authentication node 130. When the authentication response is generated by the authentication gateway node 100, it may contain the same or similar content to an authentication response generated by the authentication node 130 so that the POS terminal 120 is not aware that the authentication response was generated without authentication of the purchaser being performed by the authentication node 130.

When selectively providing the mobile payment message to the authentication node 130, the authentication gateway node 100 may selectively mark the mobile payment message to indicate whether authentication of the purchaser by the authentication node 130 is requested based on whether the POS terminal risk score satisfies a defined rule. The authentication gateway node 130 then performs authentication processing (e.g., providing authentication challenges to purchasers) for only the mobile payment messages that are marked for authentication. The authentication gateway node 130 can then generate the authentication responses based on a result of the authentication processing when performed, or based on the POS terminal risk score when authentication processing is not performed.

In another embodiment, when selectively providing the mobile payment message to the authentication node 130, the authentication gateway node 100 selectively routes the mobile payment message to the authentication node 130 for authentication of the purchaser based on whether the risk score satisfies a defined rule. Accordingly, the authentication node 130 performs purchaser authentication processes for each mobile payment message that it receives, however the authentication node 130 only receives mobile payment messages having risk scores that the authentication gateway node 100 determined to satisfy a defined rule (e.g., having a POS terminal risk score that exceeds a threshold level or alternatively that does not exceed a threshold level).

In another embodiment, the authentication node 130 can include some or all of the functionality described herein of the authentication gateway node 100. The authentication node 130 can receive all mobile payment messages, but selectively generate an authentication challenge to the user equipment 110 and/or the POS terminal 120 (FIG. 1) to authenticate the purchaser only for mobile payment messages having POS terminal risk scores that satisfy a defined rule.

Depending upon the POS terminal risk score, the authentication gateway node 100 may generate a credit account warning message which notifies the credit issuer node 140 that the account owner should be contacted and/or that privileges with an account should be halted/frozen or otherwise modified.

Although the authentication gateway node 100 is shown as being separate from the authentication node 130, in some embodiments the authentication gateway node 100 is incorporated into the authentication node 130 so that at least some of the operations disclosed herein as being performed by the authentication gateway node 100 are performed within the authentication node 130.

The authentication response (e.g., 3-D Secure authentication response code) can be generated by the authentication node 130, based on authentication processes performed with the purchaser and/or may be generated by the authentication gateway node 100 based on the POS terminal risk score (e.g., without authentication processing by the authentication node 130) and provided to the POS terminal 120. The POS terminal 120 receives the authentication response and may deny the transaction based on content of the authentication response (e.g., based on the risk score generated by the authentication gateway node 100 and/or based on the result of authentication processes by the authentication node). The POS terminal 120 can initiate verification of the transaction by communicating to a credit/debit finance issuer node 140, via an acquirer node 122 (e.g., merchant's bank), the authentication response and content of the eCommerce authentication request (e.g., cardholder information, other content of an eCommerce authentication request disclosed herein, etc).

The acquirer node 122 routes the authentication response and the content of the eCommerce authentication request to a credit/debit finance issuer node 140 (e.g., card issuing bank server such as a Visa or other card server via VisaNet, BankNet, etc.). The credit/debit finance issuer node 140 generates an authorization decision based on whether the account number has a sufficient credit limit and/or existing funds to cover the amount of the financial transaction, and can further generate the authorization decision based on the authentication response from the authentication node 130 and/or the authentication gateway node 100.

The credit/debit finance issuer node 140 communicates its authorization decision to the acquirer node 122, which communicates an authorization decision to the POS terminal 120. The POS terminal 120 decides whether to complete the transaction with the purchaser or to deny the transaction based on the authorization decision from the acquirer node 122.

Further example operations by the authentication gateway node 100 are explained below with regard to FIGS. 4 and 6.

Figure 4:
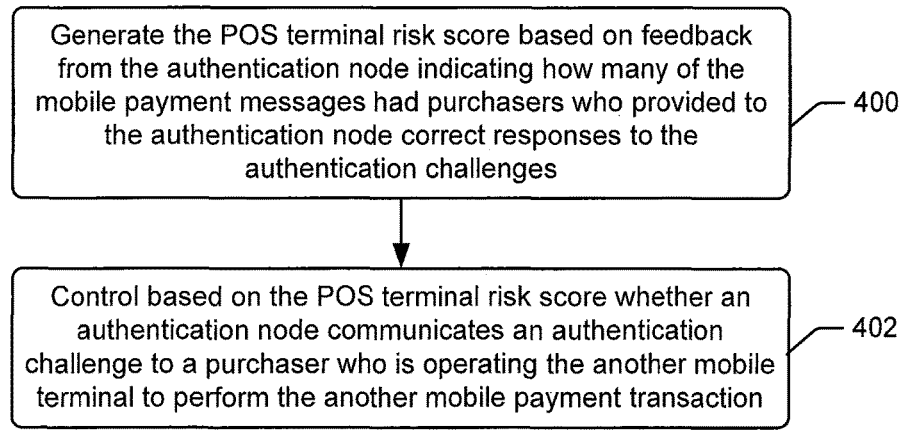

Referring to FIG. 4, the authentication gateway node 100, via the risk score generator 104, can generate (block 400) a POS terminal risk score for the POS terminal 120. The POS terminal risk score can be generated based on a number of the mobile payment messages received from mobile terminals which contain the network address for the POS terminal 120 and which further contain geographic locations provided by the mobile terminals that are within a threshold geographic proximity of each other. The POS terminal risk score can further be generated based on feedback from authentication node 130 indicating how many of the mobile payment messages, which were received from the POS terminal 120, had purchaser's who provided to the authentication node 130 correct responses to authentication challenges. The POS terminal risk score can indicate a lower risk of fraud occurring through the POS terminal 120 responsive to determining that at least a threshold number of mobile payment messages received through the POS terminal 120 have been properly authenticated.

The authentication gateway node 100 can then control whether another mobile payment message, which is received after generating the POS terminal risk score, is forwarded to the authentication node 130. More particularly, the gateway node 100 can control (block 402) based on the POS terminal risk score whether the authentication node 130 communicates an authentication challenge to a purchaser via the mobile terminal being operated by the purchaser and/or via the POS terminal 120 being operated by the purchaser.

The gateway node 100 can also generate (block 502) the transaction risk score based on content of the transaction information which includes an amount of the mobile payment transaction and information which is used to identify a financial account to be charged for the transaction. The gateway node 100 then controls, based on the POS terminal risk score and the transaction risk score, whether the authentication node communicates the authentication challenge to the purchaser who is operating the mobile terminal to perform the mobile payment transaction.

Figure 6:
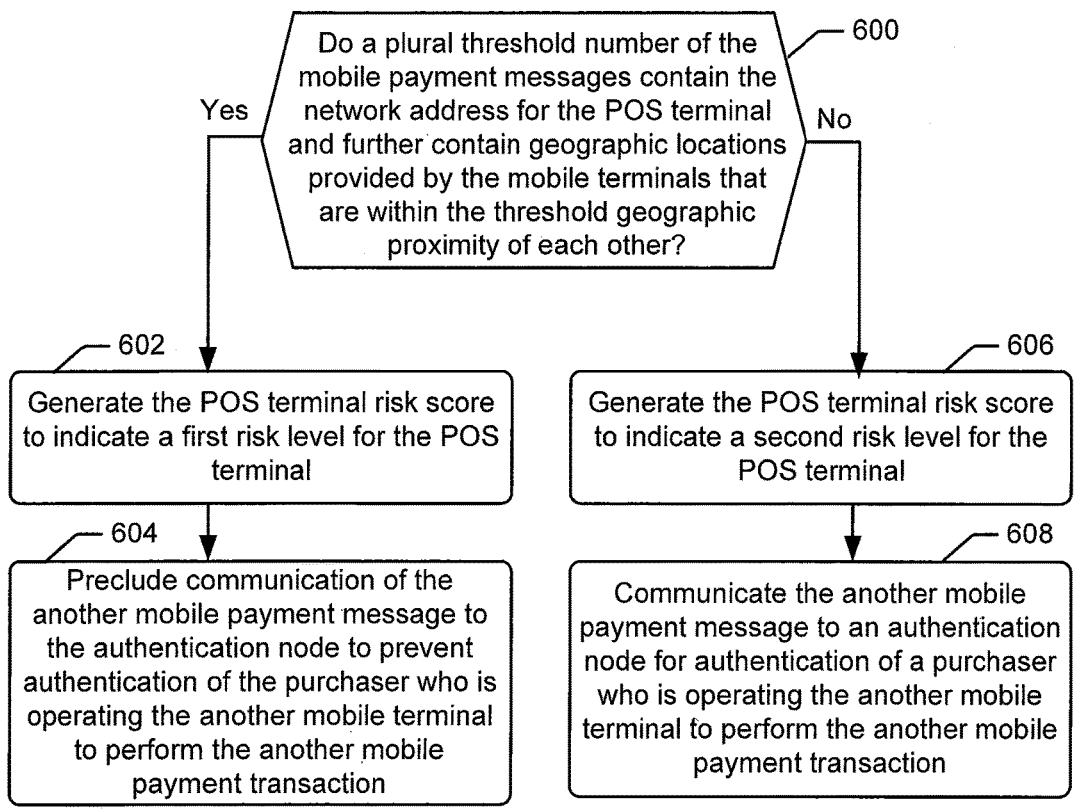

Referring to the further embodiment of FIG. 6, the authentication gateway node 100 can determine (block 600) whether a plural threshold number of the mobile payment messages contain the network address for the POS terminal 120 and further contain geographic locations provided by the mobile terminals that are within a threshold geographic proximity of each other. If the determination is satisfied, the gateway node 100 generates (block 602) the POS terminal risk score to indicate a first risk level for the POS terminal 120 and, based on the first risk level, precludes (block 604) communication of the mobile payment message to the authentication node 130 to prevent authentication of the purchaser who is operating the mobile terminal to perform the mobile payment transaction. In sharp contrast, when the determination is not satisfied, the gateway node 100 generates (block 606) the POS terminal risk score is to indicate a second risk level, which corresponds to a higher risk of fraud, for the POS terminal 120. Based on the second risk level, the gateway node 100 communicates (block 608) the mobile payment message to the authentication node 130 for authentication of a purchaser who is operating the mobile terminal to perform the mobile payment transaction. As explained above, the authentication node 130 may authenticate the purchaser by communicating an authentication challenge to the mobile terminal 110 being operated by the purchaser and/or to the POS terminal 120 being operated by the purchaser, to request entry of a PIN and/or a password. The PIN and/or password is provided as a response to the authentication node 130, which is checked against an expected response to authenticate whether the purchaser is the account owner. An authentication response can be provided to the POS terminal 120 and/or to the credit issuer node 140 to indicate whether the mobile payment transaction should be authorized and/or, more generally, has an acceptable level of risk.

Figure 7:
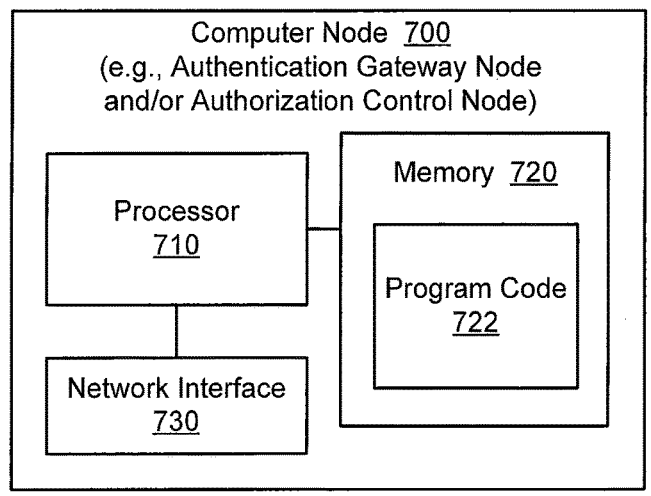
FIG. 7 is a block diagram of a computer system that may be incorporated into the authorization control node and/or the authentication gateway node of FIG. 1 in accordance with some embodiments.

FIG. 7 is a block diagram of a computer node 700 that may be used as the authorization control node 156 and/or as the authentication gateway node 100 to perform the operations of one of more of the embodiments disclosed herein for one or more of those nodes. The computer node 700 may be used as any one or more other elements of the mobile payment processing system shown in FIG. 1. The computer node 700 can include one or more network interface circuits 730, one or more processor circuits 710 (referred to as "processor" for brevity), and one or more memory circuits 720 (referred to as "memory" for brevity) containing program code 722.

The processor 710 may include one or more data processing circuits, such as a general purpose and/or special purpose processor (e.g., microprocessor and/or digital signal processor) that may be collocated or distributed across one or more networks. The processor 710 is configured to execute program code 722 in the memory 720, described below as a computer readable storage medium, to perform some or all of the operations for one or more of the embodiments disclosed herein.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks:

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    performing operations as follows on a processor of a mobile payment transaction processing system:
    receiving a plurality of mobile payment messages from a point-of-sale (POS) terminal operated by a merchant performing a plurality mobile payment transactions with a plurality of mobile devices, each of the mobile payment messages containing transaction information for a particular mobile payment transaction of the plurality of mobile payment transactions, a network address for the POS terminal, and a geographic location provided by a particular mobile device of the plurality of mobile devices associated with the particular mobile payment transaction;
    comparing the plurality of geographic locations provided by the plurality of mobile devices contained in the plurality of mobile payment messages to each other;
    generating a POS terminal risk score based on the comparing of the plurality of geographic locations to each other;
    receiving another mobile payment message from the POS terminal performing another mobile payment transaction with another mobile device subsequent to the generating of the POS terminal risk score; and
    controlling processing of the another mobile payment message to selectively allow completion of the another mobile payment transaction based on the POS terminal risk score and transaction information contained in the another mobile payment message.

2. The method of claim 1, further comprising:
    storing in a repository the POS terminal risk score logically associated with the network address for the POS terminal;
    receiving the another mobile payment message from the POS terminal; and
    retrieving the POS terminal risk score of the POS terminal from the repository based on the network address for the POS terminal contained in the another mobile payment message,
    wherein the processing of the another mobile payment message is controlled based on the POS terminal risk score retrieved from the repository.

3. The method of claim 2, wherein:
    the another mobile payment message does not contain a geographic location provided by the another mobile terminal; and
    the processing of the another mobile payment message is controlled based on the POS terminal risk score retrieved from the repository and the transaction information contained in the another mobile payment message.

4. The method of claim 1, wherein the generating a POS terminal risk score based on the comparing of the geographic locations provided by the plurality of mobile devices contained in the mobile payment messages which also contain the network address for the POS terminal, further comprises:
    generating the POS terminal risk score further based on feedback from a credit issuer node indicating how many of the plurality of mobile payment transactions corresponding to the plurality of mobile payment messages were authorized.

5. The method of claim 1, wherein the controlling processing of the another mobile payment message comprises:
    controlling, based on the POS terminal risk score, whether an authentication node communicates an authentication challenge to a purchaser who is operating the another mobile terminal to perform the another mobile payment transaction.

6. The method of claim 5, wherein the generating the POS terminal risk score based on the comparing of the plurality of geographic locations to each other, further comprises:
    generating the POS terminal risk score further based on feedback from the authentication node indicating how many of the plurality of mobile payment messages had purchasers who provided to the authentication node correct responses to the authentication challenges.

7. The method of claim 5, wherein the controlling based on the POS terminal risk score whether an authentication node communicates an authentication challenge to a purchaser who is operating the another mobile terminal to perform the another mobile payment transaction, comprises:
    selectively routing the another mobile payment message to the authentication node based on the POS terminal risk score.

8. The method of claim 1, wherein the generating a POS terminal risk score based on the comparing of the plurality of geographic locations to each other, comprises:
    generating the POS terminal risk score based on a number of the plurality of mobile payment messages that contain the network address for the POS terminal and further contain geographic locations provided by the plurality of mobile terminals that are within a threshold geographic proximity of each other.

9. The method of claim 8, wherein:
    the generating the POS terminal risk score based on a number of the plurality of mobile payment messages that contain the network address for the POS terminal and further contain geographic locations provided by the plurality of mobile terminals that are within a threshold geographic proximity of each other, comprises:
        generating the POS terminal risk score to indicate a first risk level for the POS terminal based on determining that a plural threshold number of the plurality of mobile payment messages contain the network address for the POS terminal and further contain geographic locations provided by the plurality of mobile terminals that are within the threshold geographic proximity of each other; and generating the POS terminal risk score to indicate a second risk level for the POS terminal based on determining that less than the plural threshold number of the plurality of mobile payment messages contain the network address for the POS terminal and further contain geographic locations provided by the plurality of mobile terminals that are within the threshold geographic proximity of each other; and the controlling processing of another mobile payment message based on the POS terminal risk score and transaction information contained in the another mobile payment message, comprises:

based on the second risk level being generated for the POS terminal, communicating the another mobile payment message to an authentication node for authentication of a purchaser who is operating the another mobile terminal to perform the another mobile payment transaction; and based on the first risk level being generated for the POS terminal, precluding communication of the another mobile payment message to the authentication node to prevent authentication of the purchaser who is operating the another mobile terminal to perform the another mobile payment transaction.

10. The method of claim 8, wherein:
the network address comprises at least a portion of a routing path of the another mobile payment message from the POS terminal to the processor.

11. The method of claim 8, wherein:
each mobile payment message of the plurality of mobile payment messages further contains a mobile terminal identifier; and
the generating the POS terminal risk score based on a number of the plurality of mobile payment messages that contain the network address for the POS terminal and further contain geographic locations provided by the plurality of mobile terminals that are within a threshold geographic proximity of each other, further comprises:
generating the POS terminal risk score based on how many of the plurality of mobile payment messages contain mobile terminal identifiers that are different from each other.

12. The method of claim 11, wherein the generating the POS terminal risk score based on how many of the plurality of mobile payment messages contain mobile terminal identifiers that are different from each other, comprises:
generating the POS terminal risk score to indicate a lower level of risk for the POS terminal based determining that the number of the plurality of mobile payment messages containing mobile terminal identifiers that are different from each other exceeds a defined threshold number.

13. A computer node of a mobile payment transaction processing system comprising:
a processor; and
a memory coupled to the processor and comprising computer readable program code that when executed by the processor causes the processor to perform operations comprising:
receiving a plurality of mobile payment messages from a point-of-sale (POS) terminal operated by a merchant performing a plurality mobile payment transactions with a plurality of mobile devices, each of the mobile payment messages containing transaction information for a particular mobile payment transaction of the plurality of mobile payment transactions, a network address for the POS terminal, and a geographic location provided by a particular mobile device of the plurality of mobile devices associated with the particular mobile payment transaction;
comparing the plurality of geographic locations provided by the plurality of mobile devices contained in the plurality of mobile payment messages to each other;
generating a POS terminal risk score based on the comparing of the plurality of geographic locations to each other;
receiving another mobile payment message from the POS terminal performing another mobile payment transaction with another mobile device subsequent to the generating of the POS terminal risk score; and
controlling processing of the another mobile payment message to selectively allow completion of the another mobile payment transaction based on the POS terminal risk score and transaction information contained in the another mobile payment message.

14. The computer node of claim 13, wherein the operations further comprise:
storing in a repository the POS terminal risk score logically associated with the network address for the POS terminal;
receiving the another mobile payment message from the POS terminal; and
retrieving the POS terminal risk score of the POS terminal from the repository based on the network address for the POS terminal contained in the another mobile payment message,
wherein the processing of the another mobile payment message is controlled based on the POS terminal risk score retrieved from the repository.

15. The computer node of claim 13,
wherein the generating a POS terminal risk score based on the comparing of the plurality of geographic locations to each other, further comprises,
generating the POS terminal risk score further based on feedback from a credit issuer node indicating how many of the plurality of mobile payment transactions corresponding to the plurality of mobile payment messages were authorized;
wherein the controlling processing of another mobile payment message based on the POS terminal risk score and transaction information contained in the another mobile payment message, comprises:
generating a transaction risk score based on content of the transaction information comprising an amount of the another mobile payment transaction and information which is used to identify a financial account to be charged for the transaction; and
controlling authorization of the another mobile payment transaction based on the POS terminal risk score and the transaction risk score.

16. The method of claim 1, wherein controlling processing of the another mobile payment message to selectively allow completion of the another mobile payment transaction further comprises communicating an authorization message to the POS terminal that indicates whether completion of the another mobile payment transaction is allowed.

17. The computer node of claim 13, wherein controlling processing of the another mobile payment message to selectively allow completion of the another mobile payment transaction further comprises communicating an authorization message to the POS terminal that indicates whether completion of the another mobile payment transaction is allowed.

* * * * *